March 5, 1968

J. A. MacLELLAN 3,371,965

HYDRAULIC HOISTING OF DISCRETE SOLIDS

Filed June 10, 1966

INVENTOR.
JAMES A. MacLELLAN

BY

Agent

March 5, 1968   J. A. MacLELLAN   3,371,965
HYDRAULIC HOISTING OF DISCRETE SOLIDS
Filed June 10, 1966   2 Sheets-Sheet 2

INVENTOR.
JAMES A. MacLELLAN
BY *Frank G. Piper*

Agent though the liquid supply and hoisting conduits and the loading chamber. The loading chamber has a circular cross-sectional configuration and the liquid supply conduit opens tangentially thereinto such that a vertical motion is imparted to liquid admitted to the chamber. The liquid exits through the hoisting conduit which opens tangentially from the loading chamber, preferably on the side opposite the liquid supply conduit inlet. The liquid in the loading chamber also imparts a vortical motion to the solids particles entering from the upper chamber and the particles circulate within the loading chamber until they attain a velocity equal to or greater than the average velocity of the liquid in the hoisting conduit at which stage they exit from the loading chamber via the hoisting conduit. Unlike in the prior art systems, the solid particles are not accelerated to hoisting velocity by the liquid in the hoisting conduit. Rather, the loading chamber functions to impart a hoisting velocity to the solid particles before they enter the hoisting conduit.

United States Patent Office
3,371,965
Patented Mar. 5, 1968

3,371,965
HYDRAULIC HOISTING OF DISCRETE SOLIDS
James A. MacLellan, Manitoba, Canada, assignor to Sherritt Gordon Mines Limited, Toronto, Canada, a company of Ontario
Filed June 10, 1966, Ser. No. 556,738
10 Claims. (Cl. 302—14)

ABSTRACT OF THE DISCLOSURE

A hydraulic hoist for discrete solids including liquid supply and solids hoisting conduits extending from above the ground to a solids loading level beneath the surface and a pump for discharging liquid under pressure into the supply conduit for circulation up the hoisting conduit. A loading system at the lower level includes a first chamber for receiving solids at atmospheric pressure and an associated loading chamber which receives solids from the first chamber and introduces them into the hoisting conduit at a velocity at or near the hoisting velocity while permitting uninterrupted circulation of liquid through the liquid supply and hoisting conduits.

---

This invention relates to an improved system for hydraulic hoisting of particulated ores and the like discrete solids from a lower loading level to an upper delivery level.

Methods and apparatus are known for the vertical hoisting of comminuted ores and other solids such as coal utilizing a rising column of water flowing at a rate faster than the settling velocity of the solid particles elevated. One such system is disclosed in U.S. Patent No. 2,793,082 wherein two columns of liquid are confined in two vertically disposed conduits connected at the bottom to provide a static balance of liquid in both columns. A source of pressure head is provided at the top of one column and an upward velocity is imparted to the other column. A system of locked chambers in series is provided near the lower end of the columns for introducing particulated solids into the column of upwardly flowing liquid against the static pressure without opening the column to the atmosphere.

In another system which is the subject of my co-pending application Ser. No. 456,430 now Patent No. 3,269,777, issued Aug. 30, 1966, two vertical conduits are arranged concentric with each other defining upwardly moving central column and downwardly moving annular column of liquid in static balance. The columns terminate at the lower end in a pressure chamber from whence solid particles are introduced into the upwardly flowing liquid in the central column. The velocity of the downwardly flowing liquid in the annular column is utilized in part to facilitate entry of ore particles into the central hoisting column.

While these and other systems have valuable utility in some installations, they have a number of shortcomings. One problem is that the hoisting capacity of such systems is relatively low, particularly at low upward columnar velocities, with the result that power requirements for efficient hoisting are relatively high. Further, because such systems do not permit horizontal transfer of the loaded solids at the lower level, they lack the versatility required to enable their ready utilization in existing mine shafts or other underground openings which are not specifically tailored to accommodate such sytsems. Another problem with the apparatus of Patent No. 2,793,082 is the high maintenance cost of the lock system used for introducing the solids into the hoist pipe under presssure.

It is therefore an important object of the present invention to provide a flexible, efficient system for the hydraulic hoisting of solids which is not subject to the foregoing difficulties.

Another object of the invention is to provide a hydraulic hoisting system which permits the use of a plurality of loading stations remote from each other with a single hoist conduit.

These and other objects of the present invention are attained by the provision of a hydraulic hoisting system including liquid supply and solids hoisting conduits extending from an upper delivery point above the ground to a solids loading level beneath the surface and pump means for discharging liquid under pressure into the supply conduit for circulation up the hoisting conduit. Discrete solids are introduced into the hoisting conduit at the lower level by means of an upper solids receiving chamber adapted to receive discrete solids at atmospheric pressure and an associated solids loading chamber which introduces the solids into the hoisting conduit at or near hoisting velocity while permitting uninterrupted circulation of liquid through the liquid supply and hoisting conduits.

More specifically, the solids loading chamber is arranged below the solids receiving chamber and is in communication therewith such that solids in the receiving chamber can move vertically downward into the loading chamber. Valve means within the loading chamber enables it to be isolated and sealed from the upper chamber while permitting continuous circulation of liquid It is found that this system has a high hoisting capacity at relatively low liquid velocities as compared to the capacity of prior art systems. This results in improved efficiency from greater utilization of power input. Also, the basic configuration of the system, with the liquid supply and hoisting conduits horizontally disposed at their point of entry into the loading chamber, facilitates adaptation of the system for horizontal transfer of solids at the lower level when this is desirable. This characteristic greatly increases the versatility of the system enabling its ready utilization in existing mine shafts.

The invention and the manner in which it can be attained is described in detail hereinbelow with reference to the drawings in which.

Like reference numerals refer to like parts throughout the description and drawings.

Figure 1:
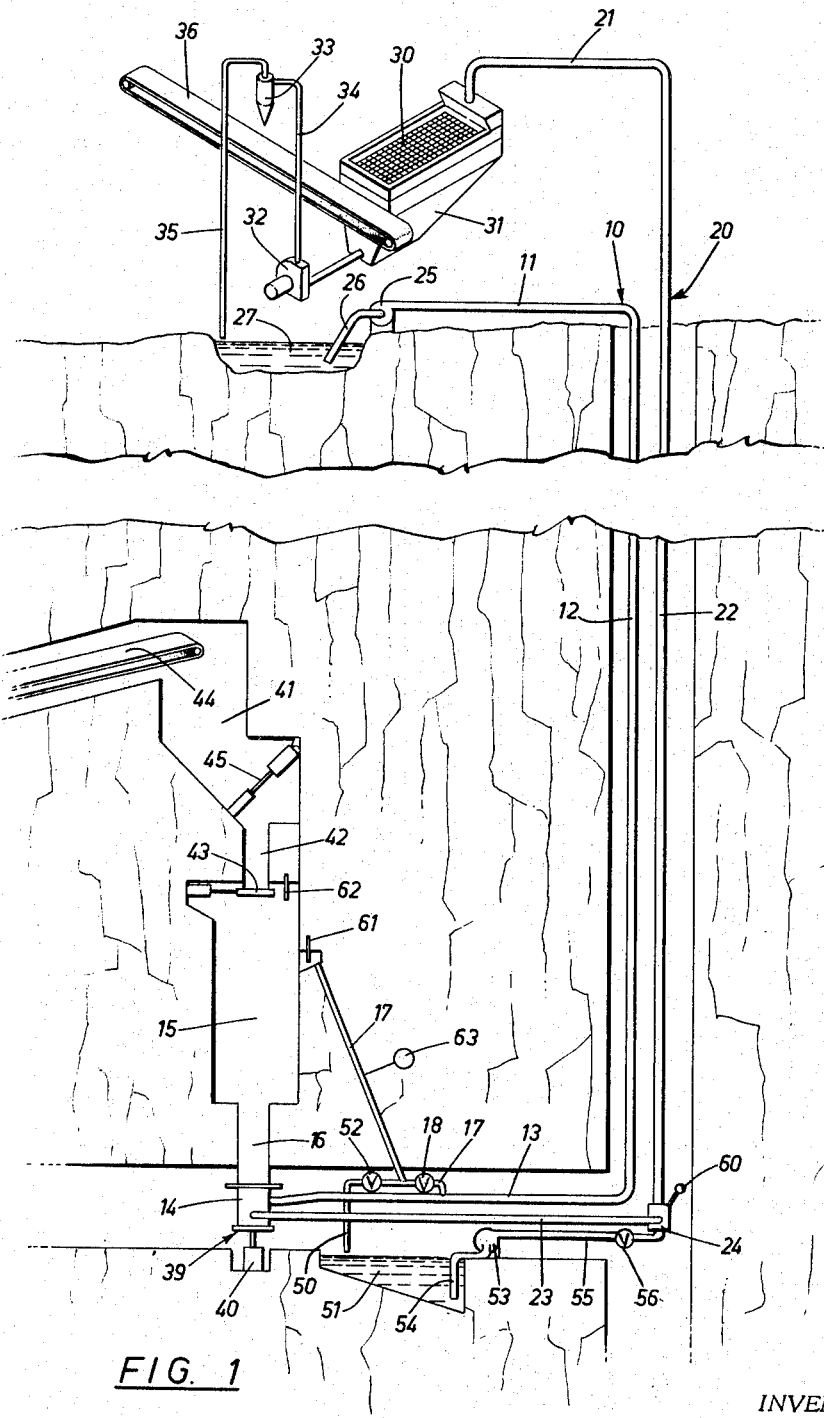
FIGURE 1 is a diagrammatic sectional view of an embodiment of the present invention in a mining installation illustrating the general relationship of the various component parts.

Referring particularly to FIGURE 1 of the drawings, the hoisting system of the present invention comprises a liquid supply conduit 10 having an upper horizontal flow line 11, a downwardly extending portion 12 and a lower horizontal inlet portion 13 communicating the surface with a solids loading chamber 14 at the loading level beneath the surface. A solids hoisting conduit 20 with upper horizontal extension 21, vertical portion 22 and lower horizontal portion 23, extends from the delivery level at the surface downwardly to the loading level communicating the surface, through a turbulence chamber 24, with solids loading chamber 14. A pump 25 having a suction line 26 disposed in water supply pond 27 is connected with feed line 11 for supplying water under pressure into the system to circulate it therethrough.

Pump 25 is stationed at the surface together with ancillary equipment for receiving and de-watering the solids-water slurry delivered from hoist column 20 and for preparing the recovered water for re-cycle. Generally, this ancillary equipment includes a double-deck screen 30, settling tank 31 transfer pump 32 connected to tank 31 and hydrocyclone 33 with connecting inlet line 34 and overflow line 35 to the pond 27. A de-watering belt 36 is provided to pick up oversize material from double deck screen 30 and underflow from hydrocyclone 33 for delivery of the recovered solids to storage and/or subsequent processing. The details of the surface de-watering apparatus are conventional and do not form part of the present invention, and therefore they will not be described in detail here. Reference can be made to copending application Ser. No. 456,430 wherein there is a more detailed discussion of a preferred de-watering apparatus suitable for use with the present invention.

The loading chamber 14, which is of cylindrical configuration, is positioned below solids receiving chamber 15 and is adapted for selective communication therewith through a cylindrical extension 16 depending from the solids receiving chamber. Particulate solids for delivery to the surface are introduced into solids hoisting conduit 20 from the loading chamber 14 through horizontal line 23.

Water supply line 10 opens tangentially into loading chamber 14 through inlet supply line 13 and hoisting conduit 20 opens tangentially from loading chamber 14 through line 23. Thus, water introduced into chamber 14 through line 13 moves in a vortex within the chamber and exits through the hoisting line 23. The vortical motion of the water in the chamber 14 imparts a similar motion to solids fed into the loading chamber. The particles revolve around the chamber until they reach a velocity near the velocity of water in the hoisting line 23 when they exit from the loading chamber 14 through line 23 and are delivered to the surface. The upper portion of solids receiving chamber 15 is communicated with inlet line 13 through a conduit 17 which has a pressure equalizer valve 18 for selectively sealing the chamber 15 from line 13. During the loading cycle, a predetermined proportion of the water delivered through line 12, up to about 50%, is introduced into chamber 15 through line 17. This improves the efficiency of the hoist by facilitating movement of solids from the receiving chamber 15 into the loading chamber 14.

Loading chamber 14 is provided with valve means 39 operated by a hydraulic actuator 40. As described in more detail hereinbelow, valve means 39 enables loading chamber 14 and conduits 13 and 23 to be sealed and isolated from solids receiving chamber 15 to permit transfer of solids into chamber 15 at atmospheric pressure. Also, for this purpose, a surge pocket 41 is positioned above receiving chamber 15 and communicates with the upper portion thereof through opening 42. A high pressure valve 43 in opening 42, preferably a quick acting hydraulic gate valve, seals and isolates chamber 15 from surge pocket 41 during the loading step of the operating cycle. Conveyor means 44 is provided to transport crushed solids from a crusher station or ore pass, not shown, to surge chamber 41 which functions to measure and store a predetermined quantity of material for rapidly delivering into the chamber 15. A hydraulically actuated rock gate 45 in pocket 41 prevents falling rock from damaging pressure valve 43 by impinging directly on it when it is in the closed position.

A bleeder line 50 connected with conduit 17 and draining into sump 51 enables removal of water displaced from receiving chamber 15 by added solids. A solenoid valve 52 in line 50 seals line 17 from the atmosphere during the hoisting cycle. A pump 53 having suction line 54 disposed in sump 51 is adapted to return displaced water to the system via return line 55 having control valve 56 and communicating with turbulence chamber 24.

Valve 56 in line 55 is regulated to remain open while pump 53 effects a positive flow of water into the turbulence chamber 24 from sump 51. Pump 53 operates independently of the remaining valves in the system and is activated by a level controller in sump 51. Valve 52 is interlocked with hydraulic actuator 40 and cannot open unless valve 39 is fully cosed. Valve 43 is also monitored to ensure that it will not open until the pressure in chamber 15 had dropped to atmospheric pressure.

Having generally described the basic components of an embodiment of the system of the invention, the operation of the said system will now be described. During the hoisting cycle, a sufficient downward velocity is imparted to liquid in conduit 10 by pump 25 to overcome flow friction losses and the head unbalance between liquid in columns 10 and 20 due to loading of the hoisting column in conduit 20 with solids and to circulate liquid through hoisting conduit 20 at sufficient velocity to hoist the soilds loaded at chamber 14. Condiuts 10 and 20 are maintained in continuous communication with each other through chamber 14 at their lowermost extremities thus ensuring a static balance of the liquid therein. When all the solids from a given loading cycle have been hoisted, a preset pressure sensor 60 detects the drop in normal hoisting pressure resulting from the removal of substantially all solids from hoisting conduit 20. This information is transmitted to hydraulic actuator 40 and the valve 39 in loading chamber 14 closes, isolating the chamber 15 from the chamber 14 and conduits 10 and 20. When valve 39 is securely closed, pressure equalizer valve 18 is automatically actuated causing it to close.

The closing of valve 18 activates drain valve 52 which opens and allows water to drain from chamber 15 through conduit 50 to displaced water sump 51. A level sensor 61 near the outlet of line 17 indicates when water has dropped to this level and drain valve 52 automatically closes and pressure valve 43 in opening 42 opens. When pressure valve 43 is fully open, rock gate 45 opens allowing rock from surge pocket 41 to enter solids receiving chamber 15. Rock gate 45 remains open until level sensor 62 near the top of chamber 15 indicates that the water has returned to that level, then the rock gate 45 closes. When it is fully closed, pressure valve 43 closes. Normally, sensor 62 will be positioned such that some air will be entrapped at the top of chamber 15.

When valve 43 is fully sealed, pressure equalizer valve 18 opens to a preset opening and when the pressure in chamber 15 is returned to normal hoisting pressure as indicated by a pressure sensor 63 in line 17, actuator 40 opens loading chamber valve 39 and hoisting is resumed.

Figure 2:
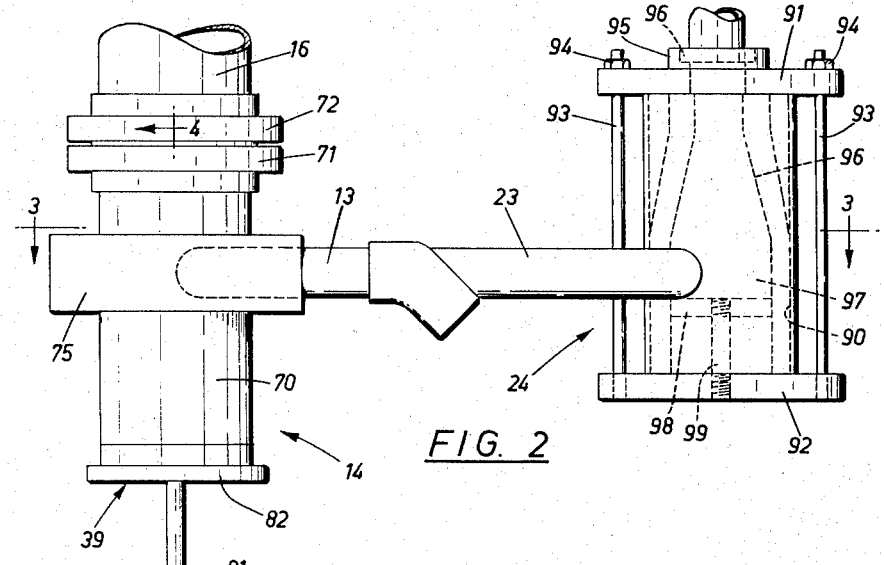
FIGURE 2 is a side elevation of the solids loading chamber and the hoisting conduit turbulence chamber.
Figure 3:
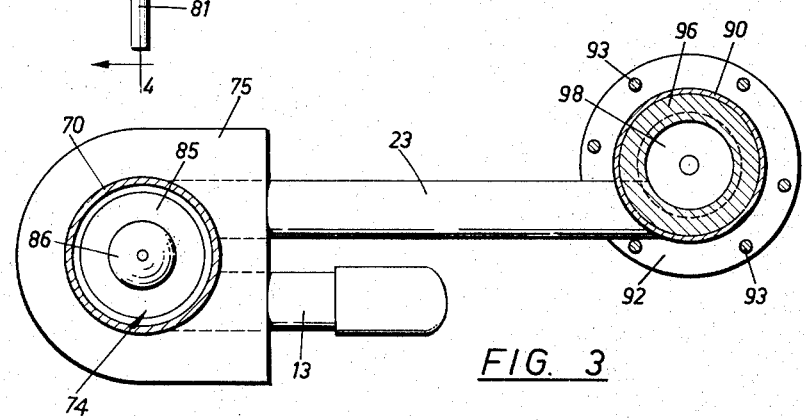
FIGURE 3 is a sectional plan view along the line 3—3 of FIGURE 2.
Figure 4:
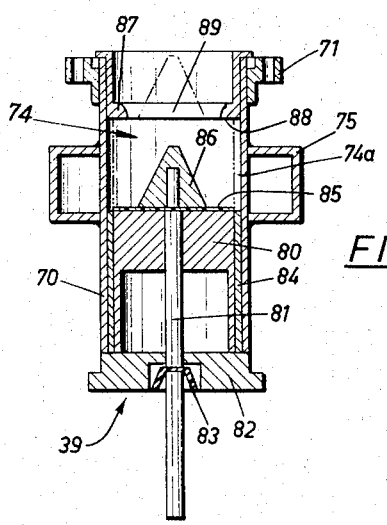
FIGURE 4 is a sectional side view taken along the line 4—4 in FIGURE 2.

FIGURES 2–4 illustrate in more detail an embodiment of the loading chamber 14 and turbulence chamber 24 and FIGURE 4 shows the details of loading chamber valve 39.

Specifically, with reference to FIGURES 2 and 3, loading chamber 14 comprises a cylindrical vessel 70 attached below solids receiving chamber 15 by flange means 71 secured to corresponding flange means 72 of extension 16 from pressure chamber 15. A cylindrical chamber 74 is defined within vessel 70. Water supply conduit 13 opens into chamber 74 at a tangent to the inner circumference thereof. Solids hoisting line 23 is in the same horizontal plane as inlet 13 and opens tangentially from the chamber 74 on the opposite side from water supply conduit 13. A housing 75 is positioned around vessel 70 to provide structural re-inforcement of the sidewalls thereof.

Water fed into chamber 74 through line 13 moves in a vortex, rapidly swirling around the chamber 74 and exiting through line 23. In order to achieve efficient loading of solids from chamber 74 into hoisting conduit 23 in accordance with the invention, it is essential that solids entering chamber 14 through extension 16 from chamber 15 be accelerated by the vortical motion of the water to a velocity about equal to or greater than the average velocity of the liquid in the hoisting line 23. That is, the principal function of the loading chamber is to accelerate the solids to hoisting velocity before they enter the hoisting conduit. When the particles reach this velocity, they exit from chamber 74 via line 23 and are readily carried by the liquid flowing therein. Accordingly, the dimensions of chamber 74 must be selected, having regard to the flow volume and rate in hoisting conduit 20, to ensure that a sufficient vortical velocity is achieved in chamber 74 to accelerate the solids to the required hoisting velocity.

Referring now to FIGURE 4, solids loading chamber valve 39 consists of a movable piston 80 fixed to a rod 81 which, in turn, is coupled to a hydraulic actuator 40 (see FIGURE 1) which is of conventional construction. A cap 82 with an opening for piston rod 81 and a packing 83 closes the lower end of chamber 74. Positioned between piston 80 and the inner surface of cylinder wall 70 is an annular spacer 84 which extends upward from the top side of cap 82 to a height about equal to the length of piston 80. The top side of piston 80 has a seal 85 formed, for example, of polytetrafluoroethylene, and an upwardly projecting conical member 86 secured thereto. A feed ring 87 is positioned in chamber 74 at a point slightly above the juncture of lines 13 and 23 with chamber 74. The bottom surface 88 of feed ring 87 provides a seat for piston seal 85 when the valve is closed. When piston 80 is moved to the closed position, as shown by the dotted lines in FIGURE 4, pressure chamber 15 is sealed and isolated from chamber 74. However, an annular space 74a having a radial width equal to the thickness of spacer 84 remains between the piston sidewall and the outer sidewall of chamber 74 which permits circulation of water through conduits 10 and 20 even when the piston 80 is in the fully closed position.

Cone 86 is an important element in the loading chamber construction. It serves to increase the flow of water around the periphery of the loading chamber thereby ensuring high vortical velocities within the chamber even at relatively low flow rates in the hoisting conduit. Cone 86 also functions to break solids "hang-ups" in feed ring opening 89 without completely closing the passageway between pick-up chamber 74 and solids receiving chamber 15; and when the piston is in the fully retracted position, the cone diverts solids coming through the feed ring to the highest velocity zone near the periphery of the loading chamber 74.

The turbulence chamber 24 through which horizontal hoisting conduit 23 is joined with vertical hoisting conduit 22 is not an essential component of the system but it had been found superior to a standard long elbow for the purposes of the invention. Also, this device facilitates delivery of solids to a single vertical hoisting conduit from a plurality of separate loading stations. That is, additional hoisting lines, similar to line 23, can be connected to turbulence chamber 24 for delivery of solids to the surface. Solids can be delivered from the various loading stations simultaneously or on an alternating basis, depending on the capacity of the vertical hoisting conduit.

The turbulence chamber 24 shown in FIGURES 2 and 3 consists of an upright cylinder 90 having top and bottom closure plates 91, 92 clamped thereto by stud bolts 93 and nuts 94. Top plate 91 is provided with a collar 95 and packing ring 96 for providing a pressure tight coupling to hoist conduit 22. Positioned in cylinder 90 is a liner 96 formed of an abrasion resistant, hardened steel alloy or other abrasion resistant material. Liner 96 defines an inner chamber 97 having a cylindrical lower portion and upwardly converging walls communicating with conduit 22. A base 98 of chamber 97 is supported on adjustable leg 99 at the same level as the lower side of conduit 23 which opens tangentially into chamber 97.

The hoisting rate of the system of this invention can be varied in three ways. Firstly, of course, the water velocity through the system can be increased by increasing the input of pump 25 to line 11. However, the rate can also be controlled either by varying the diameter of the feed ring opening 89 and/or by varying the amount of water going through the pressure equalizer valve 18 to solids receiving chamber 15. In general, the amount of water through valve 18 should not exceed 50% of the total water supplied through water supply conduit 10 and normally will be in the range of 15–30%.

It will be understood, of course, that modifications can be made in the preferred embodiments of the invention described and illustrated herein without departing from the scope of the invention defined by the appended claims.

What I claim as new and desire to protect by Letters Patent of the United States is:

1. In a hydraulic hoist for discrete solids including liquid supply and solids hoisting conduits extending from an upper delivery point to a solids loading area at a lower level and pump means for circulating liquid through said conduits, apparatus for transferring solids into the hoisting conduit at the lower level for delivery to the upper level by the circulating liquid comprising: a solids receiving chamber at the loading level for receiving solids at atmospheric pressure; first valve means for selectively sealing the solids receiving chamber from the atmosphere; a solids loading chamber positioned below said solids receiving chamber and in communication therewith, said solids loading chamber having a circular, horizontal cross-section and communicating with said liquid supply and solids hoisting conduits; second valve means for selectively sealing said loading chamber from the solids receiving chamber while permitting uninterrupted circulation of liquid through the liquid supply and solids hoisting conduits; said liquid supply and solids hoisting conduits opening into the loading chamber tangentially to the circumference thereof such that when the solids receiving chamber and the solids loading chamber are in communication, pressurized liquid admitted to the loading chamber through the liquid supply conduit moves in a vortex within the loading chamber and exits through the hoisting conduit; said loading chamber being dimensioned such that the vortical velocity of admitted liquid near the periphery thereof is at least equal to the average velocity of liquid flowing in the hoisting conduit whereby solids entering the loading chamber from the receiving chamber are accelerated by the vortical motion of the liquid to hoisting velocity before exiting from the loading chamber via the hoisting conduit.

2. Apparatus of claim 1 wherein a solids feeding pocket adapted to receive solids at atmospheric pressure is positioned above said solids receiving chamber in communication therewith through a pressure sealable opening whereby solids can be gravity fed from the feeding pocket to the receiving chamber at atmospheric pressure.

3. Apparatus of claim 2 wherein the opening communicating the feeding pocket with the receiving chamber has a rock gate adapted to prevent solids dropped into the feeding pocket from impinging directly on the first valve means.

4. Apparatus of claim 1 including a valved inlet conduit for selectively communicating the liquid supply conduit with the solids receiving chamber whereby a portion of the liquid delivered through said conduit can be directed to the solids receiving chamber.

5. Apparatus of claim 1 wherein the solids loading chamber comprises a cylindrical, downward extension of the solids receiving chamber and the liquid supply and solids hoisting conduits open tangentially into the chamber from the same direction but on opposite sides thereof.

6. Apparatus of claim 5 wherein an upright conical member is positioned adjacent the liquid supply and solids hoisting conduit openings in the loading chamber for diverting solids to the periphery thereof.

7. Apparatus of claim 1 wherein the second valve means comprises a cylindrical liner within the loading chamber extending downward from the lower juncture of the liquid supply and hoisting conduits with the said chamber, an annular valve seat within the housing chamber adjacent the upper juncture of the liquid supply and hoisting conduits with the said chamber, a cylindrical piston adapted for reciprocating movement within said liner and having a top surface adapted to engage said valve seat forming a pressure-tight seal between the loading chamber and the receiving chamber when the piston is in its extended position, said piston in its extended position defining with the cylindrical wall of the loading chamber an annular chamber with a radial width equal to the radial thickness of said liner whereby liquid can be circulated through the supply and hoisting conduits when the valve is closed.

8. Apparatus of claim 7 wherein the piston has a substantially flat top surface with an upright conical member secured thereto, said conical member having a base diameter smaller than the diameter of the piston top surface such that a flat annular surface is provided for engagement with the annular valve seat.

9. Apparatus of claim 1 wherein said solids hoisting conduit includes horizontal and vertical portions, said horizontal portion extending from the solids loading chamber and opening tangentially into a generally cylindrical turbulence chamber having a closed bottom and an opening at the top communicating with said vertical portion of the hoisting conduit.

10. A hoist for elevating discrete solids from a lower level beneath the surface of the ground to an upper level at the surface comprising: a liquid supply and a solids hoisting conduit, each extending from a delivery point at the upper level to a solids loading point at the lower level; pump means in proximity to the upper delivery point for discharging liquid under pressure into said liquid supply conduit for circulation up said solids hoisting conduit at a velocity sufficient to hoist solids loaded into the hoisting conduit at the lower level; a feed hopper at the lower level adapted to receive discrete solids at atmospheric pressure; a pressure chamber positioned below said feed hopper and in communication therewith through a downwardly extending, valved opening; a vertically arranged cylindrical loading chamber opening downwardly from said pressure chamber having a closed base and communicating with said liquid supply and hoisting conduits; valve means within the loading chamber for selectively sealing it from the pressure chamber while maintaining constant communication between the liquid supply and solids hoisting conduits for uninterrupted circulation of liquid therethrough; said liquid supply and solids hoisting conduits opening into the loading chamber at the base thereof tangentially to the circumference thereof such that when said valve means is in the open position, liquid admitted through the supply conduit will move in a vortex within the loading chamber and exit through the hoisting conduit, the diameters of the loading chamber and hoisting conduit being selected and correlated such that the velocity of admitted liquid near the periphery of the vortex will be at least equal to the average velocity of liquid flowing in the hoisting conduit.

References Cited

UNITED STATES PATENTS

| 2,793,082 | 5/1957 | Gardner | 302—14 |
| 3,269,777 | 8/1966 | MacLellan | 302—14 |
| 3,312,507 | 4/1967 | Oehlrich et al. | 302—66 |

ANDRES H. NIELSEN, *Primary Examiner.*